United States Patent
Nihanda et al.

(10) Patent No.: US 9,248,739 B2
(45) Date of Patent: Feb. 2, 2016

(54) DRIVING FORCE DISTRIBUTION CONTROL APPARATUS FOR FOUR-WHEEL DRIVE VEHICLE AND DRIVING FORCE DISTRIBUTION CONTROL METHOD FOR FOUR-WHEEL DRIVE VEHICLE

(71) Applicant: HONDA MOTOR CO., LTD., Tokyo (JP)

(72) Inventors: Norihisa Nihanda, Wako (JP); Takayuki Seki, Wako (JP); Shoichi Ohyagi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 168 days.

(21) Appl. No.: 14/225,428

(22) Filed: Mar. 26, 2014

(65) Prior Publication Data

US 2014/0297141 A1    Oct. 2, 2014

(30) Foreign Application Priority Data

Mar. 28, 2013 (JP) .................................. 2013-069576

(51) Int. Cl.
*B60W 10/119* (2012.01)
*B60K 23/08* (2006.01)

(52) U.S. Cl.
CPC .......... *B60K 23/0808* (2013.01); *B60W 10/119* (2013.01); *B60Y 2400/82* (2013.01)

(58) Field of Classification Search
None
See application file for complete search history.

(56) References Cited

U.S. PATENT DOCUMENTS

| 4,866,625 A * | 9/1989 | Kawamoto | B60K 23/0808 180/233 |
|---|---|---|---|
| 8,002,070 B2 | 8/2011 | Ghoneim et al. | |
| 2007/0265758 A1* | 11/2007 | Miura | B60T 8/1755 701/72 |
| 2009/0012669 A1* | 1/2009 | Takenaka | B60T 8/17552 701/31.4 |

FOREIGN PATENT DOCUMENTS

| JP | 04-103433 | 4/1992 |
|---|---|---|
| JP | 05-173112 | 7/1993 |
| JP | 2544295 B2 | 3/1994 |
| JP | 2004-009814 | 1/2004 |
| JP | 2010-052523 | 3/2010 |

OTHER PUBLICATIONS

Japanese Office Action for corresponding JP Application No. 2013-069576, Sep. 25, 2014.

* cited by examiner

*Primary Examiner* — Justin Holmes
(74) *Attorney, Agent, or Firm* — Mori & Ward, LLP

(57) ABSTRACT

A driving force distribution control apparatus for a four-wheel drive vehicle includes a basic distribution determination device and a servo controller. The basic distribution determination device is configured to determine basic distribution of a driving force to secondary drive wheels in accordance with the driving force and driving conditions of the vehicle. The basic distribution determination device includes a tire force limit determination device and an arithmetic device. The tire force limit determination device is configured to calculate a tire required acceleration in accordance with the driving conditions of the vehicle and configured to output a basic distribution adjustment signal having a characteristic that gradually decreases a ratio of the basic distribution for the secondary drive wheels to zero in a transient region in which the calculated tire required acceleration is lower than a predetermined threshold value.

5 Claims, 5 Drawing Sheets

DRIVING FORCE DISTRIBUTION CONTROL APPARATUS FOR FOUR-WHEEL DRIVE VEHICLE AND DRIVING FORCE DISTRIBUTION CONTROL METHOD FOR FOUR-WHEEL DRIVE VEHICLE

CROSS-REFERENCE TO RELATED APPLICATIONS

The present application claims priority under 35 U.S.C. §119 to Japanese Patent Application No. 2013-069576, filed Mar. 28, 2013, entitled "Driving Force Distribution Control Apparatus for Four-wheel Drive Vehicle." The contents of this application are incorporated herein by reference in their entirety.

BACKGROUND

1. Field

The present disclosure relates to a driving force distribution control apparatus for a four-wheel drive vehicle and a driving force distribution control method for a four-wheel drive vehicle.

2. Description of the Related Art

Japanese Patent No. 2544295 describes a technology for increasing the driving stability of a four-wheel drive vehicle by detecting lateral acceleration (lateral G) and increasing the driving force distribution ratio for a rear wheel. U.S. Pat. No. 8,002,070 describes a technology for controlling a driving force distribution between the front wheel and the rear wheel of a four-wheel drive vehicle according to the driving conditions of the vehicle. In addition, Japanese Unexamined Patent Application Publication No. 4-103433 describes a torque split four-wheel drive vehicle that directly transfers the driving force of an engine to one of front and rear wheels (a primary drive wheel) and a driving force divided using a torque split clutch to the other wheel (a secondary drive wheel). The technique for controlling the torque distribution ratio described in Japanese Unexamined Patent Application Publication No. 4-103433 is basically a technique for performing control to cause a difference in a rotational speed between the front and rear wheels to converge to zero.

SUMMARY

According to one aspect of the present invention, a driving force distribution control apparatus for a four-wheel drive vehicle includes a basic distribution determination device and a servo controller. The four-wheel drive vehicle includes a driving force transmission path via which a driving force generated by a drive source is transferred to primary drive wheels and secondary drive wheels, and a driving force distribution apparatus disposed in the driving force transmission path between the drive source and the secondary drive wheels. The basic distribution determination device is configured to determine basic distribution of the driving force to the secondary drive wheels in accordance with the driving force and driving conditions of the vehicle. The basic distribution determination device includes a tire force limit determination device and an arithmetic device. The tire force limit determination device is configured to calculate a tire required acceleration in accordance with the driving conditions of the vehicle and configured to output a basic distribution adjustment signal having a characteristic that gradually decreases a ratio of the basic distribution for the secondary drive wheels to zero in a transient region in which the calculated tire required acceleration is lower than a predetermined threshold value. The arithmetic device is configured to adjust the basic distribution for the secondary drive wheels to a ratio corresponding to the basic distribution adjustment signal output from the tire force limit determination device. The servo controller is configured to correct the driving force provided to the secondary drive wheels according to the basic distribution determined by the basic distribution determination device using a deviation between a measured value and a normative value of a rotational difference between an input shaft and an output shaft of the driving force distribution apparatus.

According to another aspect of the present invention, in a driving force distribution control method for a four-wheel drive vehicle, a driving force generated by a drive source is transferred to primary drive wheels and secondary drive wheels via a driving force transmission path. Basic distribution of the driving force to the secondary drive wheels is determined in accordance with the driving force and driving conditions of the vehicle. A tire required acceleration is calculated in accordance with the driving conditions of the vehicle. A basic distribution adjustment signal having a characteristic that gradually decreases a ratio of the basic distribution for the secondary drive wheels to zero in a transient region in which the calculated tire required acceleration is lower than a predetermined threshold value is output. The basic distribution for the secondary drive wheels is adjusted to a ratio corresponding to the basic distribution adjustment signal. The driving force provided to the secondary drive wheels is corrected according to the basic distribution determined by using a deviation between a measured value and a normative value of a rotational difference between an input shaft and an output shaft of the driving force distribution apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
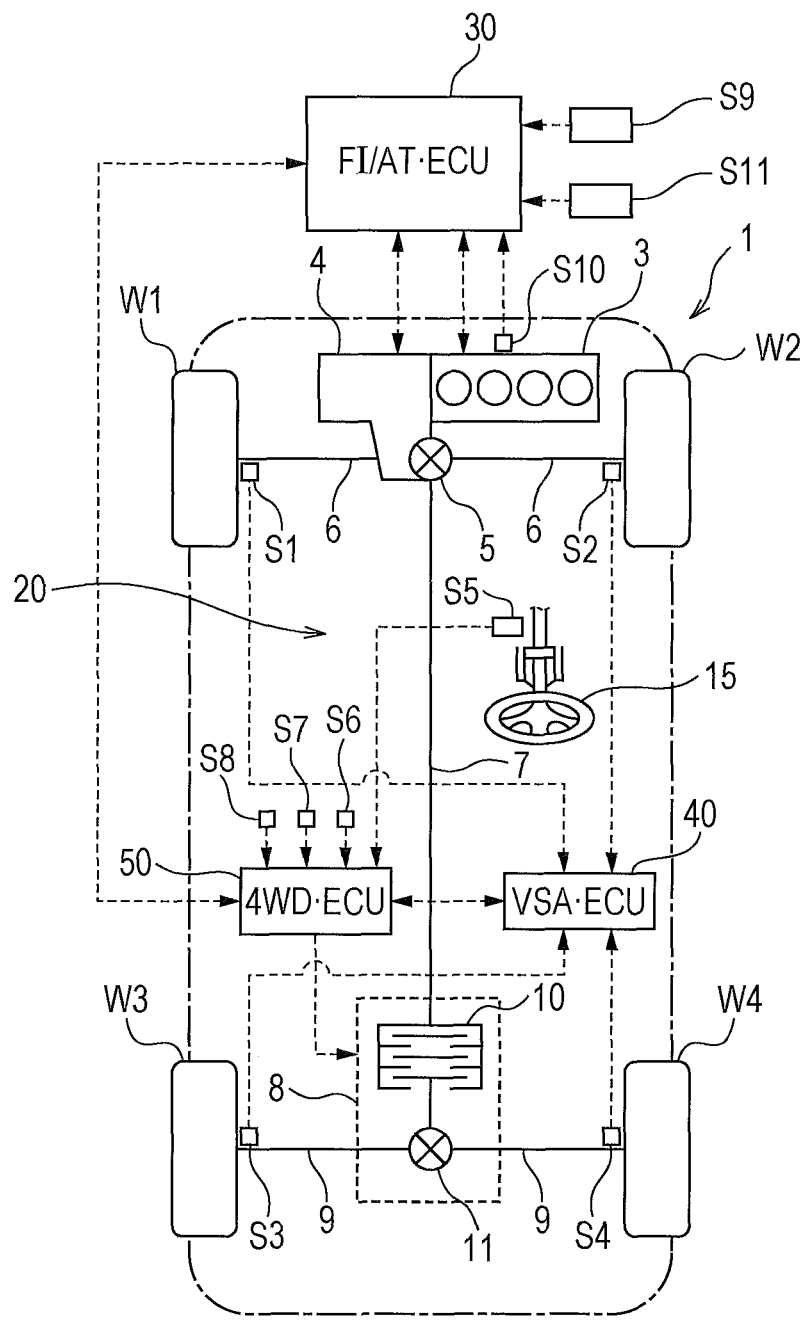
FIG. 1 is a schematic illustration of the configuration of a four-wheel drive vehicle including a driving force distribution apparatus according to an exemplary embodiment of the present technology.

The embodiments will now be described with reference to the accompanying drawings, wherein like reference numerals designate corresponding or identical elements throughout the various drawings.

As illustrated in FIG. 1, a four-wheel drive vehicle 1 includes an engine (a drive source) 3 transversely mounted in the front of the vehicle 1, an automatic transmission 4 disposed with the engine 3 in an integrated manner, and a driving force transmission path 20 that transfers a driving force of the engine 3 to front wheels W1 and W2 and rear wheels W3 and W4.

An output shaft (not illustrated) of the engine 3 is connected to the left front wheel W1 and right front wheel W2, which are primary drive wheels, via the automatic transmission 4, a front differential 5 (hereinafter simply referred to as a "front diff"), and left and right front drive shafts 6 and 6. In addition, the output shaft of the engine 3 is connected to the left rear wheel W3 and the right rear wheel W4, which are secondary drive wheels, via the automatic transmission 4, the front diff 5, a propeller shaft 7, a rear differential unit 8 (hereinafter simply referred to as a "rear diff unit"), and left and right rear drive shafts 9 and 9.

The rear diff unit 8 includes a rear differential 11 (hereinafter simply referred to as a "rear diff"), and a front/rear torque split clutch 10. The rear diff 11 distributes the driving force to the right and left rear drive shafts 9 and 9. The front/rear torque split clutch 10 connects or disconnects the driving force transmission path 20 between the propeller shaft 7 and the rear diff 11. The front/rear torque split clutch 10 functions as a driving force distribution apparatus for controlling a driving force distribution ratio for the rear wheels W3 and W4 in the driving force transmission path 20. For example, the front/rear torque split clutch 10 is formed from an electromagnetic clutch. By controlling the driving force distributed to the rear wheels W3 and W4 using the front/rear torque split clutch 10, a 4WD-ECU 50 (described in more detail below) can perform drive control so that the front wheels W1 and W2 serve as primary drive wheels and the rear wheels W3 and W4 serve as secondary drive wheels.

That is, if the front/rear torque split clutch 10 is disengaged (disconnected), the rotation of the propeller shaft 7 is not transferred to the rear diff 11 and, thus, the entire torque of the engine 3 is transferred to the front wheels W1 and W2. Accordingly, the vehicle is driven in a front-wheel drive mode (a 2WD mode). In contrast, if the front/rear torque split clutch 10 is connected, the rotation of the propeller shaft 7 is transferred to the rear diff 11 and, thus, the torque of the engine 3 is distributed to the front wheels W1 and W2 and the rear wheels W3 and W4. Accordingly, the vehicle is driven in a four-wheel drive mode (a 4WD mode). At that time, the engagement power (the gripping quantity) of the front/rear torque split clutch 10 can be variably controlled. Thus, a driving force can be distributed to the rear wheels W3 and W4 (the secondary drive wheels) in accordance with the engagement power (the gripping quantity).

The four-wheel drive vehicle 1 further includes an FI/AT-ECU 30, a VSA (Vehicle Stability Assist)-ECU 40, and a 4WD-ECU 50, which are control units for controlling driving of the vehicle. Still furthermore, the four-wheel drive vehicle 1 includes a left front wheel speed sensor S1 that detects the wheel speed of the left front wheel W1 on the basis of the rotational speed of the left front drive shaft 6, a right front wheel speed sensor S2 that detects the wheel speed of the right front wheel W2 on the basis of the rotational speed of the right front drive shaft 6, a left rear wheel speed sensor S3 that detects the wheel speed of the left rear wheel W3 on the basis of the rotational speed of the left rear drive shaft 9, and a right rear wheel speed sensor S4 that detects the wheel speed of the right rear wheel W4 on the basis of the rotational speed of the right rear drive shaft 9. The four wheel speed sensors S1 to S4 detect the wheel speeds VW1 to VW4 of the left and right rear wheels W1 to W4, respectively. Detection signals of the wheel speeds VW1 to VW4 are sent to the VSA-ECU 40.

Yet still furthermore, the four-wheel drive vehicle 1 includes a steering angle sensor S5 that detects the steering angle of a steering wheel 15, a yaw rate sensor S6 that detects the yaw rate of the vehicle body, a lateral acceleration sensor S7 that detects the lateral acceleration of the vehicle body, and a vehicle speed sensor S8 that detects the speed of the vehicle body (the vehicle speed). The detection signals output from the steering angle sensor S5, the yaw rate sensor S6, the lateral acceleration sensor S7, and the vehicle speed sensor S8 are sent to the 4WD-ECU 50.

The FI/AT-ECU 30 serves as a control unit that controls the engine 3 and the automatic transmission 4. The FI/AT-ECU 30 is formed from a microcomputer including a random access memory (RAM), a read only memory (ROM), a central processing unit (CPU), and an I/O interface (none are illustrated). The FI/AT-ECU 30 receives a detection signal of a throttle position Th detected by a throttle position sensor S9, a detection signal of an engine speed Ne detected by an engine speed sensor S10, and a detection signal of a shift position detected by a shift position sensor S11. In addition, the FI/AT-ECU 30 has an engine torque map that describes a relationship among the engine speed Ne, the throttle position Th, and an engine torque estimation value Te. The FI/AT-ECU 30 calculates the engine torque estimation value Te on the basis of the throttle position Th detected by the throttle position sensor S9 and the engine speed Ne detected by the engine speed sensor S10.

The VSA-ECU 40 is a control unit having an ABS (Anti-lock Braking System) function that prevents wheel lock by performing anti-lock control on the left and right front wheels W1 and W2 and the left and right rear wheels W3 and W4 when braking is applied, a TCS (Traction Control System) function that prevents tire slip in acceleration, and a side slip prevention system function that works when the vehicle turns. By controlling the three functions, the VSA-ECU 40 can improve the stability characteristics of the vehicle. Like the FI/AT-ECU 30, the VSA-ECU 40 is formed from a microcomputer.

Like the FI/AT-ECU 30 and the VSA-ECU 40, the 4WD-ECU 50 is formed from a microcomputer. The 4WD-ECU 50 is connected to each of the FI/AT-ECU 30 and the VSA-ECU 40 with each other. Accordingly, the 4WD-ECU 50 receives the detection signals output from the wheel speed sensors S1 to S4 and the engine speed sensor S10 and information regarding the engine torque estimation value Te through serial communication with the FI/AT-ECU 30 and the VSA-ECU 40. Upon receipt of such input information, the 4WD-ECU 50 calculates, as described in more detail below, a driving force distributed to the rear wheels W3 and W4 and a corresponding drive electrical current value for the front/rear torque split clutch 10 on the basis of a control program stored in the ROM and the values of various flags and calculation values stored in the RAM. Thereafter, the 4WD-ECU 50 outputs a drive signal based on the result of the calculation to the front/rear torque split clutch 10. In this manner, the gripping force of the front/rear torque split clutch 10 is controlled, so that the driving force distributed to the rear wheels W3 and W4 is controlled.

Figure 2:
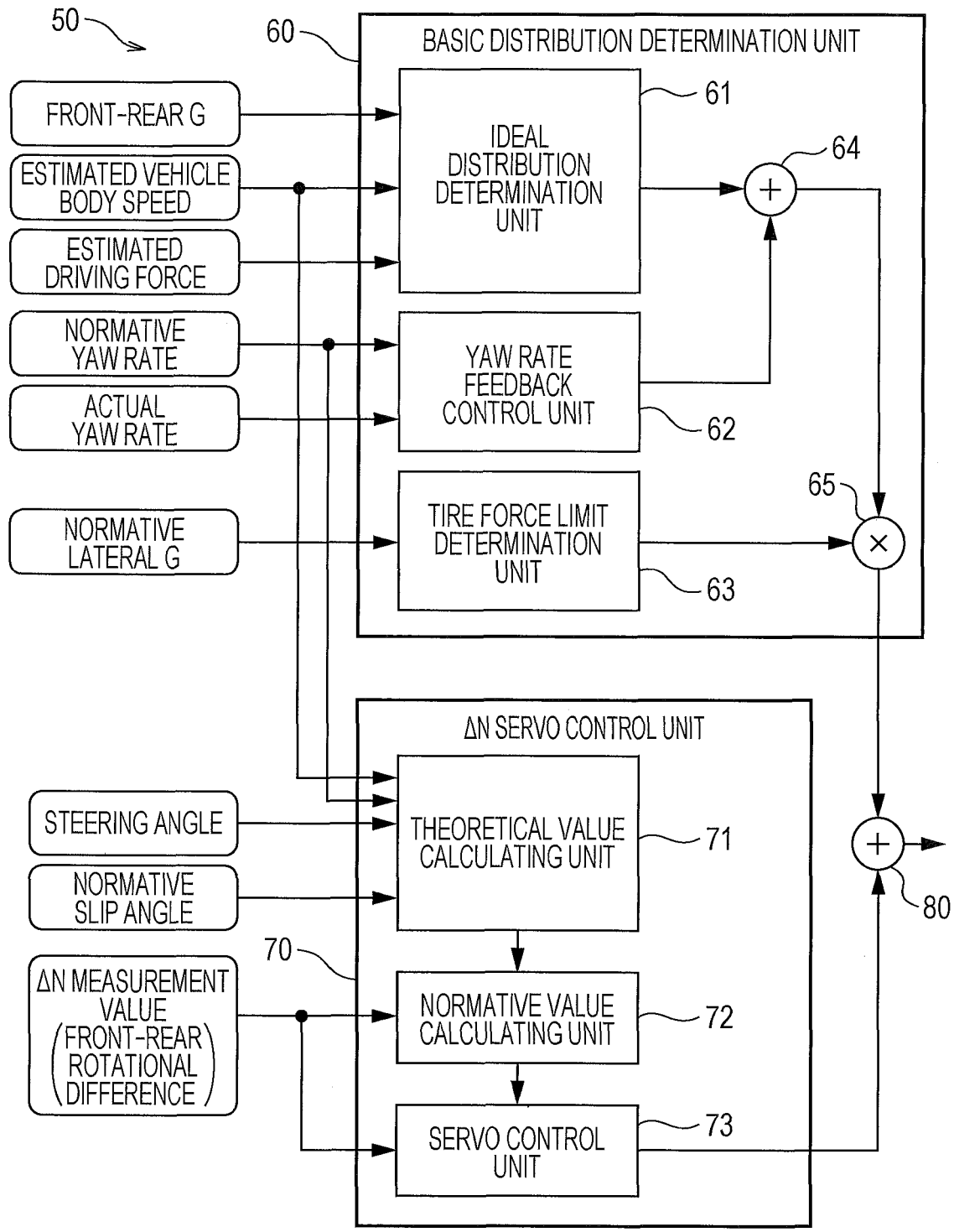
FIG. 2 is a block diagram schematically illustrating the control functions of the present technology performed by a 4WD-ECU illustrated in FIG. 1.

FIG. 2 is a block diagram schematically illustrating the control functions of the 4WD-ECU 50. The control functions illustrated in FIG. 2 are performed by computer programs for the functions. A basic distribution determination unit 60 determines a basic distribution control amount of the driving force applied to the rear wheels (the secondary drive wheels) W3 and W4 on the basis of the vertical load ratio between the front wheels (the primary drive wheels) W1 and W2 and the rear wheels (the secondary drive wheels) W3 and W4 in accordance with the driving conditions of the vehicle. A ΔN servo control unit 70 calculates a normative value (a target value) of a rotational difference (hereinafter simply referred to as a "ΔN") between the front wheels (the primary drive wheels) W1 and W2 and the rear wheels (the secondary drive wheels) W3 and W4. Thereafter, the ΔN servo control unit 70 performs servo control so that a measured value indicating an actual ΔN converges to the normative value (the target value). An adder unit 80 sums the basic distribution control amount determined by the basic distribution determination unit 60 and a deviation signal for servo control output from the ΔN servo control unit 70 and outputs the sum as the driving force distribution value for the rear wheels (the secondary drive wheels) W3 and W4. Note that as a final control amount, a value obtained by multiplying an estimated driving force by the driving force distribution value (a value between 0 to 1) is output.

The basic distribution determination unit 60 includes an ideal distribution determination unit 61, a yaw rate feedback control unit 62, and a tire force limit determination unit 63. The ideal distribution determination unit 61 estimates the vertical loads of the front and rear wheels on the basis of the estimated vehicle speed, the estimated driving force, and the acceleration of the vehicle in the front-rear direction (referred to as "front-rear G"). Thereafter, the ideal distribution determination unit 61 determines the ideal distribution ratio of a driving force applied to the rear wheels (the secondary drive wheels) W3 and W4 on the basis of the vertical load ratio. The yaw rate feedback control unit 62 calculates a deviation between the actual yaw rate (yaw rate detection data output from the yaw rate sensor S6) and the normative yaw rate calculated on the basis of the steering angle and the vehicle speed and performs yaw rate feedback control. An adder unit 64 adds the calculated deviation of the yaw rate to the ideal distribution value determined by the ideal distribution determination unit 61. In this manner, the ideal distribution value obtained by the ideal distribution determination unit 61 is corrected through the yaw rate feedback control. The yaw rate feedback control can improve the controllability of the vehicle during a turn.

The tire force limit determination unit 63 calculates the preset-friction-coefficient-based tire force use ratio of the front wheels (the primary drive wheels) W1 and W2 on the basis of a normative lateral G (an acceleration applied to the vehicle body in the lateral direction) calculated using the vehicle speed and the yaw rate (the turning angular velocity) and the estimated driving force. Thereafter, the tire force limit determination unit 63 controls the distribution ratio of the driving force to the rear wheels (the secondary drive wheels) W3 and W4 in accordance with the tire force limit. A distribution correction coefficient output from the tire force limit determination unit 63 is provided to a multiplier unit 65. Subsequently, the distribution correction coefficient is multiplied by the correction value of the ideal distribution value output from the adder unit 64. In this manner, the ideal distribution value is corrected in accordance with the tire force use ratio of the front wheels (the primary drive wheels) W1 and W2. The corrected distribution value output from the multiplier unit 65 is output as the basic distribution control amount of the driving force applied to the rear wheels (the secondary drive wheels) W3 and W4.

Figure 3:
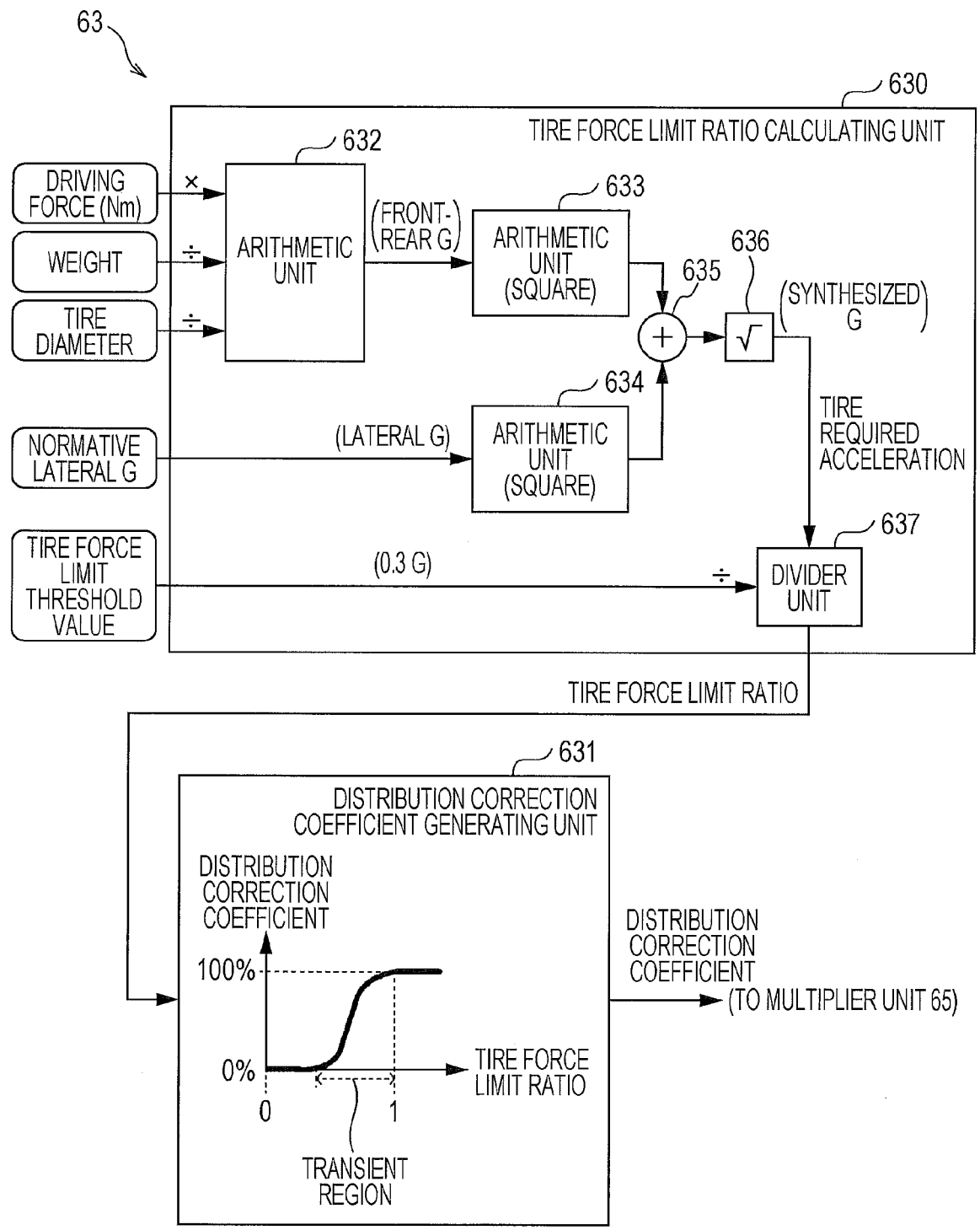
FIG. 3 is a block diagram illustrating the details of a tire force limit determination unit illustrated in FIG. 2.

The tire force limit determination unit 63 is described in more detail below with reference to FIG. 3. The tire force limit determination unit 63 includes a tire force limit ratio calculating unit 630 and a distribution correction coefficient generating unit 631. The tire force limit ratio calculating unit 630 calculates a tire required acceleration in accordance with the driving conditions of the vehicle 1 on the basis of front-rear G obtained from the estimated driving force and the normative lateral G and obtains the ratio of the tire required acceleration to a predetermined threshold value indicating the tire force limit. For example, an arithmetic unit 632 obtains the front-rear G based on the estimated driving force by dividing the driving force (an engine speed Nm) by the weight of the vehicle 1 and the diameter of the tire. Subsequently, an arithmetic unit 633 calculates the square of the front-rear G obtained by the arithmetic unit 632. In addition, an arithmetic unit 634 calculates the square of the normative lateral G. An adder unit 635 sums the two squares. Thereafter, an arithmetic unit 636 calculates the root of the sum. In this manner, by vector-synthesizing the front-rear G (denoted as "$G_1$") and the normative lateral G (denoted as "$G_2$"), a synthesized G ($=\sqrt{\{(G_1)^2+(G_2)^2\}}$) can be obtained as a tire required acceleration. A divider unit 637 divides the tire required acceleration (the synthesized G) by a predetermined threshold value indicating the tire force limit (e.g., 0.3G). Thus, the ratio of the tire required acceleration to the predetermined threshold value indicating the tire force limit (i.e., the tire force limit ratio) is obtained. For example, if the tire required acceleration is equal to the predetermined threshold value (e.g., 0.3G), the output of the divider unit 637 (the tire force limit ratio) is "1". In contrast, if the tire required acceleration is lower than the predetermined threshold value (e.g., 0.3G), the output of the divider unit 637 is a fractional value less than "1". If the tire required acceleration is higher than the predetermined threshold value, the output of the divider unit 637 is a value greater than "1".

The distribution correction coefficient generating unit 631 generates a distribution correction coefficient in accordance with the tire force limit ratio obtained by the tire force limit ratio calculating unit 630. The distribution correction coefficient has a characteristic that gradually reduces the basic distribution ratio for the secondary drive wheels until the basic distribution ratio for the secondary drive wheels becomes zero in the transient region in which the tire required acceleration is lower than the predetermined threshold value. An example of the gradually reducing characteristic is illustrated in a block indicating the distribution correction coefficient generating unit 631 in FIG. 3. For example, the distribution correction coefficient generating unit 631 includes a map or a table that stores the predetermined characteristic. The distribution correction coefficient generated by the distribution correction coefficient generating unit 631 is a value including a fractional value in the range from 1 to 0, which is input to the multiplier unit 65 illustrated in FIG. 2 as a basic distribution adjustment signal. The output of the multiplier unit 65 serves as the basic distribution control amount determined by the basic distribution determination unit 60 and is input to the adder unit 80. The output of the adder unit 80 is output as a driving force distribution value for the rear wheels (the secondary drive wheels) W3 and W4.

If the tire force limit ratio is higher than or equal to 1, the distribution correction coefficient generating unit 631 generates a value of "1" as the distribution correction coefficient. If the distribution correction coefficient is 1, the ideal distribution value (the correction value) of the basic distribution for the secondary drive wheels output from the adder unit 64 is directly output (with a ratio of 100%) from the multiplier unit 65.

If the tire force limit ratio is in a predetermined transient region less than 1, the distribution correction coefficient generating unit 631 generates, as the distribution correction coefficient, a fractional value less than 1 in accordance with the gradually reduced characteristic. When the distribution correction coefficient is a fractional value less than 1 in accordance with the gradually reduced characteristic, the ideal distribution value of the basic distribution to the secondary drive wheels output from the adder unit 64 (the correction value) is adjusted with a ratio (%) lower than 100% and higher than 0% in accordance with the characteristic and is output from the multiplier unit 65.

If the tire force limit ratio is less than a value in the predetermined transient region, the distribution correction coefficient generating unit 631 generates a value of "0" as the distribution correction coefficient. When the distribution correction coefficient is 0, the ideal distribution value of the basic distribution to the secondary drive wheels (the correction value of the theoretical deviation value) output from the adder unit 64 (the correction value) is adjusted with a ratio of 0%. Thus, the basic distribution to the secondary drive wheels output from the multiplier unit 65 is set to "0".

Referring back to FIG. 2, the ΔN servo control unit 70 includes a theoretical value calculating unit 71, a normative value calculating unit 72, and a servo control unit 73. The theoretical value calculating unit 71 obtains the theoretical value of the rotational speed of the front wheels (the primary drive wheels) W1 and W2 and the theoretical value of the rotational speed of the rear wheels (the secondary drive wheels) W3 and W4 on the basis of the steering angle, vehicle speed, yaw rate, and slip angle of the vehicle 1. Thereafter, the theoretical value calculating unit 71 calculates a rotational difference normative theoretical value (referred to as a "ΔN normative theoretical value") indicating a difference between the theoretical values of the rotational speeds of the input shaft and output shaft of the front/rear torque split clutch 10 on the basis of the two rotational speed theoretical values. The normative value calculating unit 72 calculates a rotational difference normative value by correcting the rotational difference normative theoretical value on the basis of a deviation between the actual measurement value of the rotational difference ΔN between the input and output shafts of the front/rear torque split clutch 10 (hereinafter referred to as a "ΔN measurement value") and the rotational difference normative theoretical value. Note that for example, the ΔN measurement value is calculated as a difference between the rotational speed of the input shaft of the front/rear torque split clutch 10 obtained on the basis of the average speed of the front axle based on the outputs of the front wheel speed sensors S1 and S2 provided on the front drive shafts 6 and a gear ratio from the input shaft of the front/rear torque split clutch 10 (the rotary shaft of the front-wheel clutch) to the front drive shafts 6 and the rotational speed of the output shaft of the front/rear torque split clutch 10 obtained on the basis of the average speed of the rear axle based on the outputs of the rear wheel speed sensors S3 and S4 provided on the rear drive shafts 9 and a gear ratio from the output shaft of the front/rear torque split clutch 10 (the rotary shaft of the rear-wheel clutch) to the rear drive shafts 9. Alternatively, a rotation sensor may be provided on each of the input shaft and the output shaft of the front/rear torque split clutch (the driving force distribution apparatus) 10, and a difference between the measured rotational speeds of the input and output shafts of the clutch may be calculated. Still alternatively, the measurement (calculation) may be performed by using any appropriate measurement technique. According to the present exemplary embodiment, the clutch rotational difference ΔN is defined as a value obtained by subtracting the rotational speed of the output shaft of the front/rear torque split clutch 10 (on the secondary drive wheel side) from the rotational speed of the input shaft of the front/rear torque split clutch 10 (on the primary drive wheel side). The servo control unit 73 corrects the driving force distributed to the rear wheels (the secondary drive wheels) W3 and W4 by the front/rear torque split clutch (the driving force distribution apparatus) 10 through servo control of a measurement value of the rotational difference ΔN, the target value of which is the rotational difference normative value calculated by the normative value calculating unit 72. By correcting the ΔN normative theoretical value using the ΔN measurement value, an optimal rotational difference normative value can be obtained in accordance with a variation in the vehicle condition that cannot be corrected by using only the theoretical value, and driving force distribution to the rear wheels (the secondary drive wheels) W3 and W4 can be controlled on the basis of the obtained optimal rotational difference normative value. The output of the servo control unit 73 is input to the adder unit 80 and is added to the basic distribution control amount output from the multiplier unit 65 (if the output of the servo control unit 73 is negative, the output is subtracted from the basic distribution control amount). Note that according to the present technology, the normative value calculating unit 72 is not essential, and the need for the normative value calculating unit 72 may be eliminated. That is, by using a deviation between some normative value based on the driving conditions of the vehicle 1 (e.g., the ΔN normative theoretical value obtained by the theoretical value calculating unit 71) and a measurement value of the rotational difference between the primary drive wheel and the secondary drive wheel (i.e., the ΔN measurement value), the ΔN servo control unit 70 can correct the driving force that is to be distributed to the rear wheels W3 and W4 and that is calculated on the basis of the basic distribution determined by the basic distribution determination unit 60.

By using such a configuration, if the ratio of the tire required acceleration in accordance with the driving conditions to the tire force limit threshold value (e.g., 0.3G) (i.e., the tire force limit ratio) is higher than or equal to 100%, the output of the tire force limit determination unit 63 (i.e., the basic distribution adjustment signal) is "1" and, thus, the basic distribution ratio of the driving force to the secondary drive wheels determined in accordance with the driving conditions of the vehicle (the output of the adder unit 64) is set to 100%. In this manner, the vehicle 1 operates in a full four-wheel-drive mode. In contrast, if the ratio of the tire required acceleration to the tire force limit threshold value (e.g., 0.3G) (i.e., the tire force limit ratio) is in the predetermined transient region lower than 100%, the output of the tire force limit determination unit 63 (i.e., the basic distribution adjustment signal) is a fractional value less than "1" and, thus, the basic distribution of the driving force to the secondary drive wheels determined in accordance with the driving condition of the vehicle (i.e., the output of the adder unit 64) is adjusted using a ratio (%) in accordance with the above-described characteristic so as to be less than 100% and greater than 0% of the output. The adjusted value is output from the multiplier unit 65. However, if the tire force limit ratio is lower than the predetermined transient region, the output of the tire force limit determination unit 63 (the basic distribution adjustment signal) is "0". The basic distribution ratio of the driving force to the secondary drive wheels (the output of the adder unit 64) is set to 0%. Accordingly, the vehicle 1 is driven by only the primary drive wheels (the front wheels W1 and W2).

In this manner, when all wheel drive is unnecessary from the viewpoint of the tire required acceleration (e.g., in the case of traffic jam or high-speed cruising), the driving force distribution to the rear wheels W3 and W4 can be set to zero. Accordingly, the fuel cost can be reduced. In addition, the consumption of electricity by the front/rear torque split clutch 10 (e.g., the electromagnetic clutch) can be reduced. Furthermore, in the transient region in which the calculated tire required acceleration is lower than a predetermined threshold value, the basic distribution to the rear wheels W3 and W4 is adjusted so as to gradually decrease to zero. Accordingly, disconnection and connection of the driving force to the rear wheels W3 and W4 are not abruptly performed. In this manner, control without shock can be performed.

Furthermore, control using the ΔN servo control unit 70 is additionally performed. Accordingly, even in a region in which the tire required acceleration is lower than the predetermined threshold value, the driving force can be distributed to the rear wheels W3 and W4 so that the rotational difference measurement value converges to the normative value when driving of the rear wheels W3 and W4 is required (e.g., when the vehicle is travelling on a slippery road, such as an icy road). In this manner, a stable driving can be provided.

An example of the ΔN servo control unit 70 is described in more detail below with reference to FIG. 4. For example, the theoretical value calculating unit 71 obtains the rotational speed theoretical value of the rotary shaft (the input shaft) of the front/rear torque split clutch 10 on the "front wheels (the primary drive wheels) W1 and W2" side and the rotational speed theoretical value of the rotary shaft (the output shaft) of the front/rear torque split clutch 10 on the "rear wheels (the secondary drive wheels) W3 and W4" side and, thereafter, calculates the rotational difference normative theoretical value (the ΔN normative theoretical value) indicating the difference between the two rotational speed theoretical values as follows:

Clutch input shaft rotational speed theoretical value=$A\{V\cdot\cos(\delta-\beta)+\gamma\cdot L_f \sin \delta\}$, Clutch output shaft rotational speed theoretical value=$B\cdot V\cdot\cos \beta$, and $\Delta N$ normative theoretical value=clutch input shaft rotational speed theoretical value−clutch output shaft rotational speed theoretical value.

Figure 5:
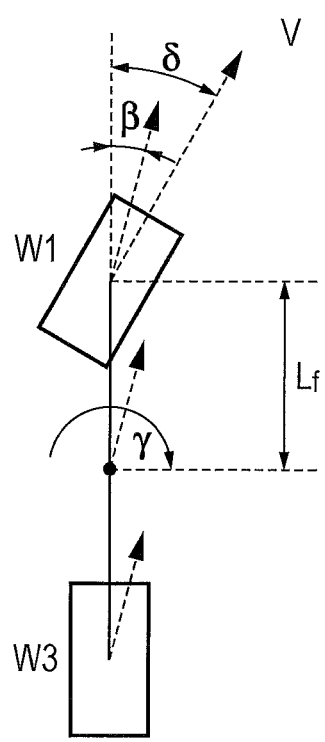
FIG. 5 illustrates a vehicle two-wheel model.

The above-described equations are provided on the basis of a well-known ideal vehicle two-wheel model illustrated in FIG. 5, where $\delta$ denotes the steering angle, $\beta$ denotes the normative slip angle, $\gamma$ denotes the normative yaw rate, $L_f$ denotes the distance between the center of gravity of the vehicle and the front drive shaft 6, V denotes the vehicle speed, A denotes the coefficient for converting the vehicle speed into the rotational speed of the front wheel rotary shaft of the front/rear torque split clutch 10, and B denotes the coefficient for converting the vehicle speed into the rotational speed of the rear wheel rotary shaft of the front/rear torque split clutch 10. The front wheel conversion coefficient A is determined in accordance with, for example, the tire dynamic load radius of the front wheels (the primary drive wheels) W1 and W2, the front wheel drive gear ratio, and the hypoid gear ratio. The rear wheel conversion coefficient B is determined in accordance with, for example, the tire dynamic load radius of the rear wheels (the secondary drive wheels) W3 and W4 and a rear wheel diff gear ratio. Note that the normative yaw rate $\gamma$ is calculated on the basis of an ideal vehicle two-wheel model using the current vehicle speed V and the steering angle $\delta$ of the vehicle 1. In addition, the normative slip angle $\beta$ is calculated on the basis of the ideal vehicle two-wheel model using the current vehicle speed V, the front-rear G, and the lateral G of the vehicle 1.

Figure 4:
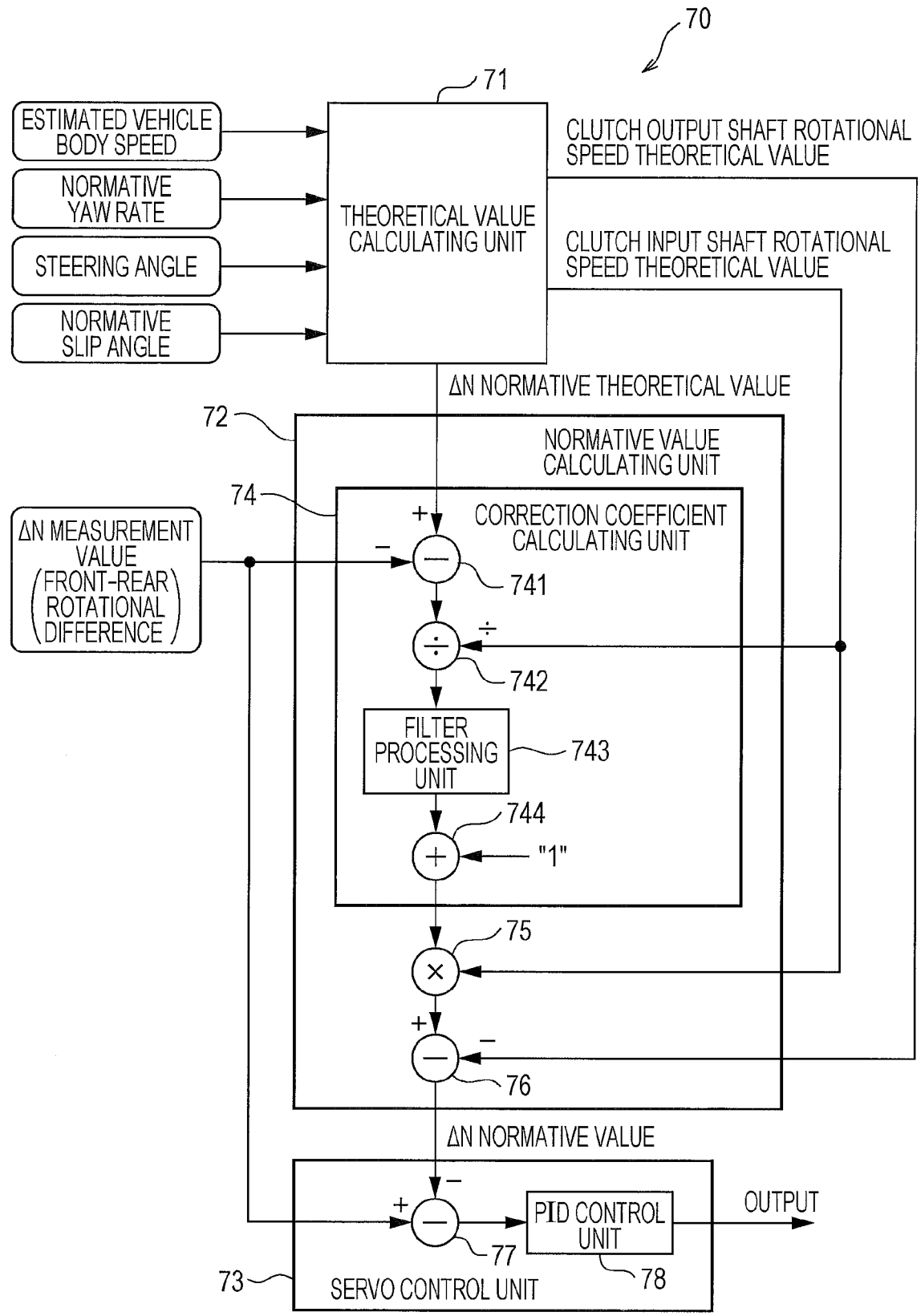
FIG. 4 is a block diagram illustrating the details of a ΔN servo control unit illustrated in FIG. 2.

As illustrated in FIG. 4, the normative value calculating unit 72 includes a correction coefficient calculating unit 74. The correction coefficient calculating unit 74 calculates a correction coefficient used for correcting the ΔN normative theoretical value calculated by the theoretical value calculating unit 71 in accordance with an actual ΔN measurement value. In the correction coefficient calculating unit 74, a subtractor unit 741 subtracts the ΔN measurement value from the ΔN normative theoretical value calculated by the theoretical value calculating unit 71. Thus, the subtractor unit 741 obtains a deviation between the actual ΔN measurement value and the ΔN normative theoretical value (the deviation between an actual value and a theoretical value). A divider unit 742 divides the deviation obtained by the subtractor unit 741 by the clutch input shaft rotational speed theoretical value calculated by the theoretical value calculating unit 71 so as to obtain the ratio of the deviation to the clutch input shaft rotational speed theoretical value. That is, the divider unit 742 converts the deviation between the actual value and the theoretical value of the input/output shaft rotational difference ΔN of the front/rear torque split clutch 10 into the ratio of the deviation to the clutch input shaft rotational speed theoretical value. The output of the divider unit 742 is input to a filter processing unit 743. The output of the divider unit 742 is a value including a positive or negative decimal fraction close to "0". The filter processing unit 743 performs lowpass filter processing on the output so that the driving force distribution apparatus does not respond to a temporary change in the input signal. The output of the filter processing unit 743 is provided to an adder unit 744 and is added to a reference coefficient value of "1". The output of the filter processing unit 743 is a value including a positive or negative decimal fraction close to "0" and eases a temporary (or abrupt) change. Thus, the output is in a region in which the vehicle behavior is stable. The output of the adder unit 744 is output as the correction coefficient calculated by the correction coefficient calculating unit 74. The correction coefficient is a value including a decimal fraction close to "1". As can be seen from the above description, the correction coefficient serves as a ratio to the clutch input shaft rotational speed theoretical value.

The correction coefficient output from the adder unit 744 is input to a multiplier unit 75 and is multiplied by the clutch input shaft rotational speed theoretical value calculated by the theoretical value calculating unit 71. In this manner, the clutch input shaft rotational speed theoretical value calculated by the theoretical value calculating unit 71 is corrected using the correction coefficient. That is, the clutch input shaft rotational speed theoretical value is corrected to a value obtained by taking into account the deviation between the actual value and the theoretical value of the rotational difference ΔN between the input and output shafts of the front/rear torque split clutch 10. The output of the multiplier unit 75 is input to a subtractor unit 76, and a difference between the output and the clutch output shaft rotational speed theoretical value calculated by the theoretical value calculating unit 71 is calculated. That is, the clutch output shaft rotational speed theoretical value is subtracted from the clutch input shaft rotational speed theoretical value modified by taking into account the deviation between the actual value and the theoretical value of a front-rear rotational difference ΔN. Thus, a normative value of the modified clutch rotational difference ΔN based on the theoretical value can be obtained. In this manner, a rotational difference normative value (referred to as a "ΔN normative value") obtained by correcting the ΔN normative theoretical value can be obtained from the subtractor unit 76 on the basis of the deviation between the actual ΔN measurement value and the ΔN normative theoretical value.

The ΔN normative value calculated by the normative value calculating unit 72 in this manner is input to a subtractor unit 77 of the servo control unit 73 and is subtracted from the ΔN measurement value. The output of the subtractor unit 77 serves as the deviation value "ΔN measurement value−ΔN normative value" used for servo control and is input to a PID (proportion/integration/differential) control unit 78. The output of the PID control unit 78 serves as a servo control output signal for the ΔN servo control unit 70, is input to the adder unit 80 (refer to FIG. 2), and is added to the basic distribution control amount (if the output of the PID control unit 78 is negative, the output is subtracted from the basic distribution control amount). The gripping force of the front/rear torque split clutch (the driving force distribution apparatus) 10 is variably controlled in accordance with the output of the adder unit 80. In this manner, the servo control is performed so that the driving force distributed to the rear wheels (the secondary drive wheels) W3 and W4 by the front/rear torque split clutch (the driving force distribution apparatus) 10 is corrected. For example, if the driving force transferred to the rear wheels (the secondary drive wheels) W3 and W4 is insufficient, the deviation value "ΔN measurement value−ΔN normative value" output from the subtractor unit 77 is positive. Accordingly, the servo control is performed so that the driving force transferred to the rear wheels (the secondary drive wheels) W3 and W4 increases. In contrast, if the driving force transferred to the rear wheels (the secondary drive wheels) W3 and W4 is excessive, the deviation value "ΔN measurement value−ΔN normative value" output from the subtractor unit 77 is negative. Accordingly, the servo control is performed so that the driving force transferred to the rear wheels (the secondary drive wheels) W3 and W4 decreases.

Through the above-described configuration, the theoretical value calculating unit 71 calculates a theoretical clutch rotational difference in accordance with the driving conditions of the vehicle as the ΔN normative theoretical value. However, the calculated value is not directly used as the normative value (the target value) of servo control. The normative value calculating unit 72 modifies the ΔN normative theoretical value to obtain the ΔN normative value on the basis of the deviation between the ΔN normative theoretical value and the actual ΔN measurement value. In this manner, an optimal ΔN normative value can be obtained in adapting to a variation that cannot be compensated for by the theoretical value. That is, if a deviation between the ΔN normative theoretical value and the ΔN measurement value appears at all times, it is considered that such a deviation occurs due to a normally occurring variation (e.g., a variation in a tire diameter, a sensor error, or a setting error in a normative model). Thus, the normative value calculating unit 72 detects such a normally occurring variation, calculates a correction coefficient corresponding to the normally occurring variation by using the correction coefficient calculating unit 74, and obtains the ΔN normative value corrected by using the correction coefficient. By obtaining the optimal ΔN normative value in adapting to the variation that cannot be compensated for by the theoretical value and performing servo control so that the ΔN measurement value converges to the ΔN normative value, the traction performance and the controllability of the vehicle during a turn in the case where friction coefficients of the front and rear wheels (the primary and secondary drive wheels) differ from each other can be improved. In addition, driving force distribution control can be performed in adapting to the variation. Furthermore, the risk caused by a sensor error or a setting error in the normative model can be reduced.

While the above exemplary embodiment has been described with reference to the normative value calculating unit 72 that corrects the clutch input shaft rotational speed theoretical value using the correction coefficient, the technique is not limited thereto. For example, the clutch output shaft rotational speed theoretical value may be corrected, or both the clutch input shaft rotational speed theoretical value and the clutch output shaft rotational speed theoretical value may be corrected. Alternatively, calculation may be performed so that the ΔN normative theoretical value is directly corrected. In addition, the present technology may be applied to a configuration in which the rear wheels function as the primary drive wheels and the front wheels function as the secondary drive wheels. The front/rear torque split clutch (the driving force distribution apparatus) 10 is not limited to an electromagnetic clutch. For example, the front/rear torque split clutch 10 may be a fluid pressure clutch.

According to an embodiment of the present technology, a driving force distribution control apparatus for a four-wheel drive vehicle including a driving force transmission path (20) that transfers a driving force from a drive source (3) to primary drive wheels and secondary drive wheels and a driving force distribution apparatus (10) disposed in the driving force transmission path between the drive source and the secondary drive wheels is provided. The driving force distribution control apparatus includes a basic distribution determination unit (60) configured to determine basic distribution of the driving force to the secondary drive wheels in accordance with the driving force and driving conditions of the vehicle, where the basic distribution determination unit includes a tire force limit determination unit (63) configured to calculate a tire required acceleration in accordance with the driving conditions of the vehicle and output a basic distribution adjustment signal having a characteristic that gradually decreases the basic distribution ratio for the rear wheels to zero in a transient region in which the calculated tire required acceleration is lower than a predetermined threshold value and an arithmetic unit (64) configured to adjust the basic distribution ratio for the secondary drive wheels to a ratio corresponding to the basic distribution adjustment signal output from the tire force limit determination unit, and a servo control unit (70) configured to correct the driving force biased to the secondary drive wheels according to the basic distribution ratio determined by the basic distribution determination unit using a deviation between a measured value and a normative value of a rotational difference between an input shaft and an output shaft of the driving force distribution apparatus. Note that the above-described reference symbols between parentheses indicate corresponding components of an exemplary embodiment described below only for the purpose of reference.

According to an embodiment of the present technology, in a configuration that determines a basic distribution of the driving force to the secondary drive wheels in accordance with the driving force of the drive source and the drive conditions of the vehicle, the tire required acceleration is calculated in accordance with the drive conditions of the vehicle. If the calculated tire required acceleration is lower than a predetermined threshold value, the distribution ratio of the driving force to the secondary drive wheels can be set to zero. Thus, when all wheel drive is unnecessary from the viewpoint of the tire required acceleration (e.g., in the case of traffic jam or high-speed cruising), the driving force distribution to the rear wheels can be set to zero. Accordingly, the fuel cost can be reduced. In addition, the electricity consumption of the driving force distribution apparatus (e.g., an electromagnetic clutch) can be reduced. Furthermore, in a transient region in which the calculated tire required acceleration is lower than the predetermined threshold value, the basic distribution ratio for the secondary drive wheels is adjusted so as to gradually decrease to zero. Accordingly, disconnection and connection of the driving force to the secondary drive wheels are not abruptly performed. In this manner, control without shock can be performed. Still furthermore, a servo control unit can be provided in order to correct the driving force distributed to the secondary drive wheels according to the basic distribution controlled in this manner on the basis of a deviation in the rotational difference between an input shaft and an output shaft of the driving force distribution apparatus. Thus, even in a region in which the tire required acceleration is lower than the predetermined threshold value, the driving force can be distributed to the secondary drive wheels so that the rotational difference measurement value converges to the normative value when driving of the secondary drive wheels is required (e.g., when the vehicle is travelling on a slippery road, such as an icy road). In this manner, a stable driving can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. A driving force distribution control apparatus for a four-wheel drive vehicle including a driving force transmission path via which a driving force generated by a drive source is transferred to primary drive wheels and secondary drive wheels, and a driving force distribution apparatus disposed in the driving force transmission path between the drive source and the secondary drive wheels, the driving force distribution control apparatus comprising:
a basic distribution determination device configured to determine basic distribution of the driving force to the secondary drive wheels in accordance with the driving force and driving conditions of the vehicle, the basic distribution determination device comprising:
a tire force limit determination device configured to calculate a tire required acceleration in accordance with the driving conditions of the vehicle and configured to output a basic distribution adjustment signal having a characteristic that decreases a ratio of the basic distribution for the secondary drive wheels to zero in a transient region in which the calculated tire required acceleration is lower than a predetermined threshold value; and
an arithmetic device configured to adjust the basic distribution for the secondary drive wheels to a ratio corresponding to the basic distribution adjustment signal output from the tire force limit determination device; and
a servo controller configured to correct the driving force provided to the secondary drive wheels according to the basic distribution determined by the basic distribution determination device using a deviation between a measured value and a normative value of a rotational difference between an input shaft and an output shaft of the driving force distribution apparatus.

2. The driving force distribution control apparatus for a four-wheel drive vehicle according to claim 1, wherein the servo controller includes a device configured to obtain a rotational speed theoretical value of the primary drive wheels and a rotational speed theoretical value of the secondary drive wheels based on a steering angle, a vehicle speed, a yaw rate and a slip angle of the four-wheel drive vehicle and calculate the normative value based on the two rotational speed theoretical values.

3. The driving force distribution control apparatus for a four-wheel drive vehicle according to claim 1, wherein the tire force limit determination device is configured to calculate the tire required acceleration based on an acceleration of the vehicle in a front-rear direction and an acceleration of the vehicle in a lateral direction.

4. A driving force distribution control apparatus for a four-wheel drive vehicle including a driving force transmission path via which a driving force generated by a drive source is transferred to primary drive wheels and secondary drive wheels, and a driving force distribution apparatus disposed in the driving force transmission path between the drive source and the secondary drive wheels, the driving force distribution control apparatus comprising:
basic distribution determination means for determining basic distribution of the driving force to the secondary drive wheels in accordance with the driving force and driving conditions of the vehicle, the basic distribution determination means comprising:
tire force limit determination means for calculating a tire required acceleration in accordance with the driving conditions of the vehicle and for outputting a basic distribution adjustment signal having a characteristic that decreases a ratio of the basic distribution for the secondary drive wheels to zero in a transient region in which the calculated tire required acceleration is lower than a predetermined threshold value; and
arithmetic means for adjusting the basic distribution for the secondary drive wheels to a ratio corresponding to the basic distribution adjustment signal output from the tire force limit determination means; and
servo control means for correcting the driving force provided to the secondary drive wheels according to the basic distribution determined by the basic distribution determination means using a deviation between a measured value and a normative value of a rotational difference between an input shaft and an output shaft of the driving force distribution apparatus.

5. A driving force distribution control method for a four-wheel drive vehicle, the method comprising:
transferring a driving force generated by a drive source to primary drive wheels and secondary drive wheels via a driving force transmission path;
determining basic distribution of the driving force to the secondary drive wheels in accordance with the driving force and driving conditions of the vehicle;
calculating a tire required acceleration in accordance with the driving conditions of the vehicle;
outputting a basic distribution adjustment signal having a characteristic that decreases a ratio of the basic distribution for the secondary drive wheels to zero in a transient region in which the calculated tire required acceleration is lower than a predetermined threshold value;
adjusting the basic distribution for the secondary drive wheels to a ratio corresponding to the basic distribution adjustment signal; and
correcting the driving force provided to the secondary drive wheels according to the basic distribution determined by using a deviation between a measured value and a normative value of a rotational difference between an input shaft and an output shaft of the driving force distribution apparatus.

* * * * *